US007983248B2

(12) United States Patent
Goto (10) Patent No.: US 7,983,248 B2
(45) Date of Patent: Jul. 19, 2011

(54) INFORMATION COMMUNICATION TERMINAL

(75) Inventor: Shinya Goto, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 151 days.

(21) Appl. No.: 12/408,628

(22) Filed: Mar. 20, 2009

(65) Prior Publication Data

US 2010/0067520 A1    Mar. 18, 2010

(30) Foreign Application Priority Data

Mar. 26, 2008  (JP) ................................. 2008-080624

(51) Int. Cl.
*H04L 12/28* (2006.01)
*H04L 12/66* (2006.01)
*H04W 4/00* (2009.01)
(52) U.S. Cl. ......... 370/352; 370/351; 370/356; 455/461
(58) Field of Classification Search .......... 370/352–389, 370/235–328; 379/88–93; 455/411–550; 709/218–229
See application file for complete search history.

(56) References Cited

U.S. PATENT DOCUMENTS

| 6,510,324 | B2 |   | 1/2003  | Fukumura |         |
|-----------|----|---|---------|----------|---------|
| 7,099,309 | B2 | * | 8/2006  | Davidson | 370/352 |
| 7,457,278 | B2 | * | 11/2008 | Son et al. | 370/351 |
| 2003/0169860 | A1 | * | 9/2003 | Chou | 379/88.17 |
| 2005/0089021 | A1 | * | 4/2005 | Vallejo | 370/352 |
| 2005/0157708 | A1 | * | 7/2005 | Chun | 370/356 |
| 2006/0187900 | A1 | * | 8/2006 | Akbar | 370/352 |
| 2007/0238472 | A1 | * | 10/2007 | Wanless | 455/461 |
| 2009/0022149 | A1 | * | 1/2009 | Rosenberg et al. | 370/389 |
| 2009/0147771 | A1 | * | 6/2009 | Seal et al. | 370/352 |
| 2009/0147778 | A1 | * | 6/2009 | Wanless et al. | 370/389 |

FOREIGN PATENT DOCUMENTS

| JP | H11-196476 A | 7/1999 |
|----|--------------|--------|
| JP | 2005-269165 A | 9/2005 |
| JP | 2005-295414 A | 10/2005 |
| JP | 2006-080997 A | 3/2006 |
| JP | 2008-005185 A | 1/2008 |

OTHER PUBLICATIONS

Japan Patent Office; Notice of Reasons for Rejection in Japanese Patent Application No. 2008-08624 mailed Apr. 20, 2010.

* cited by examiner

*Primary Examiner* — Man Phan
(74) *Attorney, Agent, or Firm* — Baker Botts L.L.P.

(57) ABSTRACT

A information communication terminal is provided which includes: a voice communication device that transmits and receives voice signals to and from an other telephone equipment via a public switched telephone network; a data communication device that transmits and receives call data signals as digitized voice signals to and from an other terminal via an IP network; a message communication device that transmits and receives data signals of an instant message which contains character information to and from an other terminal via an IP network; and a control device that makes the message communication device transmit the data signals of the instant message to a destination of the call data signals so as to enable communication by voice as well as character information, when one of the voice signals and the call data signals is received while the other is being transmitted and received.

9 Claims, 10 Drawing Sheets

FIG.7A | RECEIVING IP CALL. . .

FIG.7B | RECEIVED CALL FROM *** (LOGIN NAME OF CALLER)

FIG.8A | ON ANOTHER LINE

FIG.8B | IM PREFERRED BECAUSE ON ANOTHER LINE

*** (LOGIN NAME OF CALLER) IS LOGGED OFF

FIG.13

| NAME | IP ADDRESS | IM EXECUTION SETTINGS |
|---|---|---|
| AAA | *** . *** . *** . *** | IM ACCEPTED |
| BBB | *** . *** . *** . *** | IM NOT ACCEPTED |
| CCC | *** . *** . *** . *** | IM ACCEPTED |
| ⋮ | ⋮ | ⋮ |

INFORMATION COMMUNICATION TERMINAL

CROSS-REFERENCE TO RELATED APPLICATIONS

This application claims the benefit of Japanese Patent Application No. 2008-080624 filed Mar. 26, 2008 in the Japan Patent Office, the disclosure of which is incorporated herein by reference.

BACKGROUND

This invention relates to an information communication terminal including: a voice communication device that transmits and receives voice signals to and from other telephone equipment via public switched telephone networks; a data communication device that transmits and receives data signals of network calls to and from other network terminals via Internet Protocol (hereinafter, referred to as "IP") networks; and an instant messaging function.

In recent years, IP network calls (so-called IP calls and Internet calls) which are telephone communication means by data communication via the Internet and/or a dedicated line are becoming widely used due to expansion of digital communication networks through the Internet and/or a dedicated line and reduction of charges for Internet use.

However, there are problems in IP network calls as follows. The IP network calls do not cover a communicable range that is covered by conventional public switched telephone networks (hereinafter, referred to as "PSTN"). Also, the IP network calls are disabled in the case of power outage. Therefore, a telephone terminal is proposed which is adapted to communicate both via PSTN and IP networks.

In the telephone terminal configured as above, users can select either network to use by their own selection. Moreover, a technique is proposed to enhance efficient selection of the two networks, in which, when an incoming call is received via a PSTN, a phone number for an IP network call (VoIP phone number) corresponding to the phone number on the other end is obtained so as to switch the communication network to an IP network (VoIP communication). Such a technique allows prompt switching to IP network calls when it is convenient to use IP networks rather than PSTN.

SUMMARY

In the conventional technique, however, when a user, while communicating via either a PSTN or an IP network, receives an incoming call via the other communication network, the user cannot be simultaneously connected via the both communication networks. Accordingly, there is a problem in that communication via one of the networks cannot be immediately started.

It is, therefore, desirable to provide an information communication terminal which allows the user, while communicating via one of a PSTN and an IP network, to smoothly start communication via the both communication networks when an incoming call is received via the other communication network.

In one aspect of the present invention, an information communication terminal may be provided which includes: a voice communication device that transmits and receives voice signals to and from an other telephone equipment via a public switched telephone network; a data communication device that transmits and receives call data signals as digitized voice signals to and from an other terminal via an IP network; a message communication device that transmits and receives data signals of an instant message which contains character information to and from an other terminal via an IP network; and a control device that makes the message communication device transmit the data signals of the instant message to a destination of the call data signals so as to enable communication by voice as well as character information, when one of the voice signals and the call data signals is received while the other is being transmitted and received.

According to the information communication terminal configured as such, when an incoming call is received from a third party via one of a PSTN and an IP network while the other is being used, an instant message can be sent to the other end of the IP network. That is, the user can use instant messaging (hereinafter, referred to as "IM") to communicate with the other end of the IP network while communicating with the other end of the PSTN. Accordingly, the user can smoothly start communication with the both ends of the networks.

BRIEF DESCRIPTION OF THE DRAWINGS

The present invention will now be described below, by way of embodiments, with reference to the accompanying drawings, in which.

DETAILED DESCRIPTION OF THE PREFERRED EMBODIMENTS

First Embodiment (1.1) Overall Structure

Figure 1:
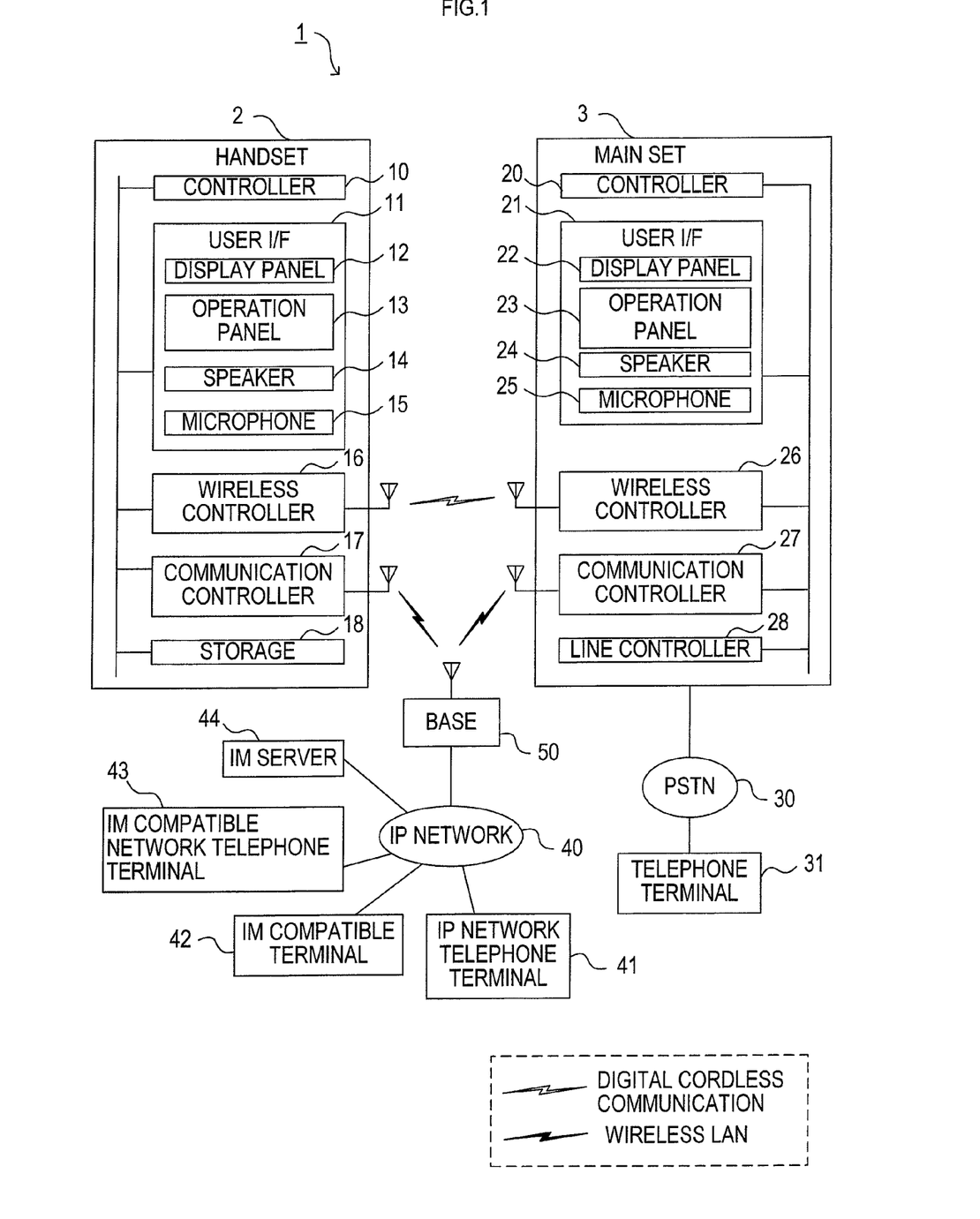
FIG. 1 is a block diagram showing a configuration of an information communication terminal.

An information communication terminal 1 of the present embodiment includes a handset 2 and a main set 3, as shown in FIG. 1. The information communication terminal 1 includes a PSTN (public switched telephone network) telephone function, an IP (Internet Protocol) telephone function, and an IM (instant messaging) function.

The PSTN telephone function is a function to make and receive a PSTN call by transmitting and receiving voice signals to and from a telephone terminal 31 via a PSTN 30.

The IP telephone function is a function for so-called IP phone and Internet phone, to make and receive an IP network call to and from a terminal (corresponding to an IP network telephone terminal 41 and an IM compatible network telephone terminal 43 in FIG. 1) connected to an Internet network or a dedicated line by transmitting encoded data as voice signals in packets via an IP network (Internet network and/or dedicated line) 40.

The IM function is a function to transmit and receive realtime messages to and from the terminal connected to the IP network 40 by transmitting data showing character information in packets via the IP network 40 (IM communication).

The IM communication is achieved by an IM server (IM server 44 in FIG. 1) controlling the IM communication and an IM client (corresponding to the information communication terminal 1, an IM compatible terminal 42 and an IM compatible network telephone terminal 43 in FIG. 1) provided with a dedicated application software which enables the IM client to communicate with predetermined peer IM clients through IM.

The IM server obtains state information from each IM client regarding whether or not the client can at least receive a message. Each IM client can refer to the state information to see whether or not the peer IM clients can communicate through IM.

The IM server establishes, in response to a request from any of the IM clients, a session with a peer IM client so that the IM client and the peer IM client can communicate with each other through IM.

In the above IM communication, once the IM client transmits a message, the massage is instantly displayed on the side of the IM peer client who receives the message. Therefore, realtime communication can be achieved.

The handset 2 and the main set 3 can communicate with each other through digital cordless communication (communication based on the standard of digital cordless phone) and a wireless LAN.

The handset 2 is a terminal having a function for communicating via PSTN calls and IP network calls and a function for transmitting and receiving packets for IP network calls and IM communication. The handset 2 includes a controller 10, a user interface (hereinafter, referred to as "user I/F") 11, a wireless controller 16, a communication controller 17, and a storage 18, all of which are connected via bus lines.

The controller 10 is mainly configured as a microcomputer including a CPU, a ROM, a RAM and so on. The controller 10 controls each component composing the handset 2 in an integrated manner. The controller 10 also performs encoding and decoding between voice signals and data signals for use in IP network calls.

The user I/F 11 includes a display panel 12 which displays various information, an operation panel 13 provided with a plurality of operation keys, a speaker 14 and a microphone 15 for use in communication.

The wireless controller 16 transmits and receives voice signals to and from a later-described wireless controller 26 of the main set 3 using digital cordless communication.

The communication controller 17, connected to a base 50 by the wireless LAN, transmits and receives data to and from the main set 3 via the base 50 and also transmits and receives data to and from an external terminal via the IP network 40.

The storage 18 includes a storage unit such as a nonvolatile memory. The storage 18 stores programs for making the controller 10 execute each process later described, and various data including telephone directory data which contains information on the external terminal to be connected via the PSTN 30 and the IP network 40, and others.

The main set 3 is a terminal having a function for communicating through PSTN calls and IP network calls, a function for generating instant messages, and a function of displaying the instant messages received by the handset 2. The main set 3 includes a controller 20, a user I/F 21, the wireless controller 26, a communication controller 27, and a line controller 28, all of which are connected via bus lines.

The controller 20 is mainly configured as microcomputer including a CPU, a ROM, a RAM and so on. The controller 10 controls each component composing the main set 3 in an integrated manner.

The user I/F 21 includes a display panel 22 which displays various information, an operation panel 23 provided with a plurality of operation keys, a speaker 24 and a microphone 25 for use in communication. An instant message can be generated by using the operation keys of the operation panel 23. The generated message and the instant message received from the handset 2 are displayed on the display panel 22.

The wireless controller 26 transmits and receives voice signals to and from the wireless controller 16 of the handset 2 using digital cordless communication.

The communication controller 27, connected to the base 50 by the wireless LAN, transmits and receives data to and from the handset 2 via the base 50.

The line controller 28 is connected to the PSTN 30. The line controller 28 transmits and receives voice signals to and from the telephone terminal 31.

Connected to the IP network 40 to which the information communication terminal 1 is connected via the wireless LAN are the IP network telephone terminal 41, the IM compatible terminal 42, the IM compatible network telephone terminal 43, and an IM server 44.

The IM compatible network telephone terminal 43 can communicate through. IP network calls and IM. The IM compatible network telephone terminal 43 corresponds to a terminal of an IP network phone provided with an IM function, a personal computer provided with an application software which allows communication through IP network calls and IM.

(1.2) Cooperation of Each Component
(1.2.1) Cooperation During Voice Call

In the case of communication through an IP network call, packets transmitted from the IP network telephone terminal 41 or the like on the other end of the line are received by the communication controller 17 via the IP network 40. The packets are decoded into voice signals by the controller 10 to be outputted from the speaker 14 as voice. Voice signals indicating voice supplied from the microphone 15 of the handset 2 are encoded by the controller 10 to be transmitted to the network telephone terminal 41 or the like on the other end of the line by the communication controller 17.

As a result of the above process, the handset 2 can communicate through an IP network call. The main set 3 can use an IP network call via the handset 2 by transmitting and receiving voice signals to and from the handset 2 through digital cordless communication.

In the case of communication through a PSTN call, the main set 3 transmits and receives voice signals to and from the telephone terminal 31 via the PSTN 30. Thereby, the main set 3 can communicate through a PSTN call. The handset 2 uses a PSTN call via the main set 3 by transmitting and receiving voice signals to and from the main set 3 through digital cordless communication.

(1.2.2) Cooperation during IM Communication

In the case of IM Communication, packets transmitted from the IM compatible terminal 42 or the like on the other end of the line are received by the communication controller 12 of the handset 2 via the IP network 40. The packets are converted to main set transmission information by the controller 3 for transmission to the main set 3. The converted main set transmission information is transmitted from the communication controller 17 to the communication controller 27 of the main set 3 via the wireless LAN. In the main set 3, an instant message is displayed on the display panel 22 based on the received main set transmission information.

Message information which is data indicating the instant message generated using the operation panel 23 of the main set 3 is transmitted from the communication controller 27 to the communication controller 17 via the wireless LAN. Thereafter, the message information received by the communication controller 17 is converted to packet data for transmission through the IP network 40, thereby to be transmitted from the communication controller 17 to the IM compatible terminal 42 or the like.

(1.3) State Transition of Information Communication Terminal 1

Hereinafter, communication state transition in the information communication terminal 1, the telephone terminal 31 and the IM compatible network telephone terminal 43 is described by way of FIGS. 2A-5D. In each figure, the information communication terminal 1 is represented by 'A', the telephone terminal 31 by 'B' and the IM compatible network telephone terminal 43 by 'C'.

Figure 2A:
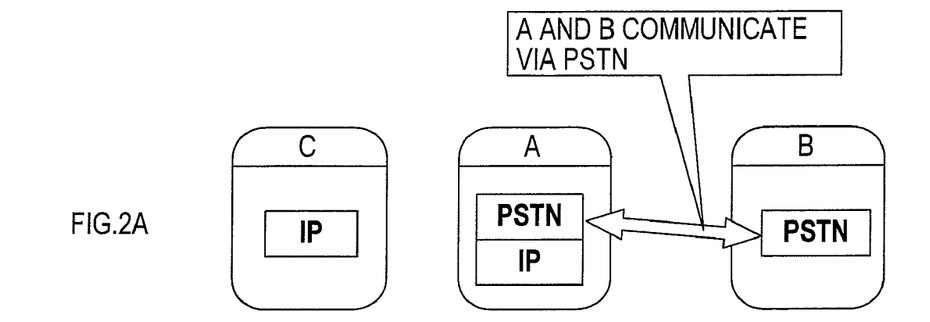
FIGS. 2A-2D are state transition diagrams of the information communication terminal when an incoming network call is received during a PSTN call.

FIG. 2A-2D show the state transition in case that C makes an IP network call to A while A and B communicate through a PSTN call. FIG. 2A shows a state in which A and B communicate via a PSTN.

Figure 2B:
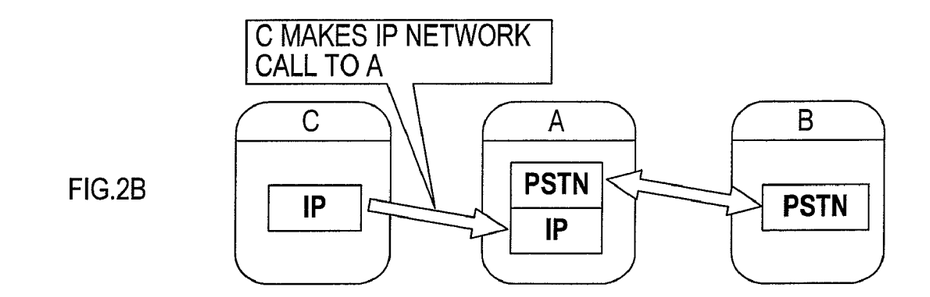
Figure 2C:
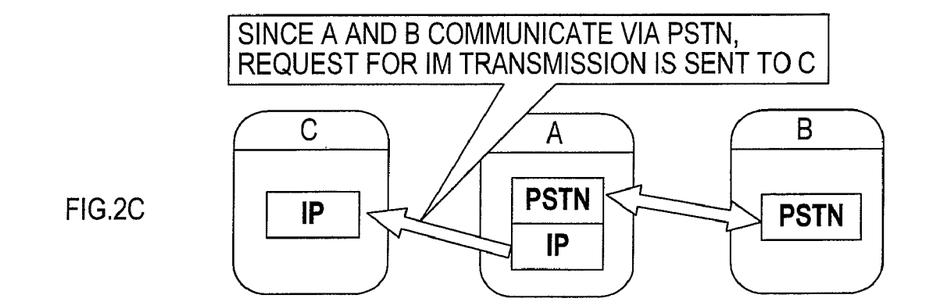
Figure 2D:
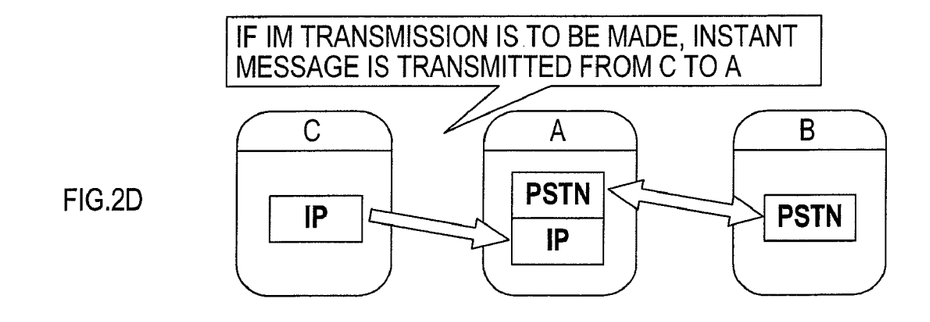

Then, as shown in FIG. 2B, when C makes an IP network call to A, A requests C to communicate through IM by sending an instant message to C, as shown in FIG. 2C. If C accepts the request to communicate through IM, an instant message is sent from C to A, as shown in FIG. 2D.

Figure 3:
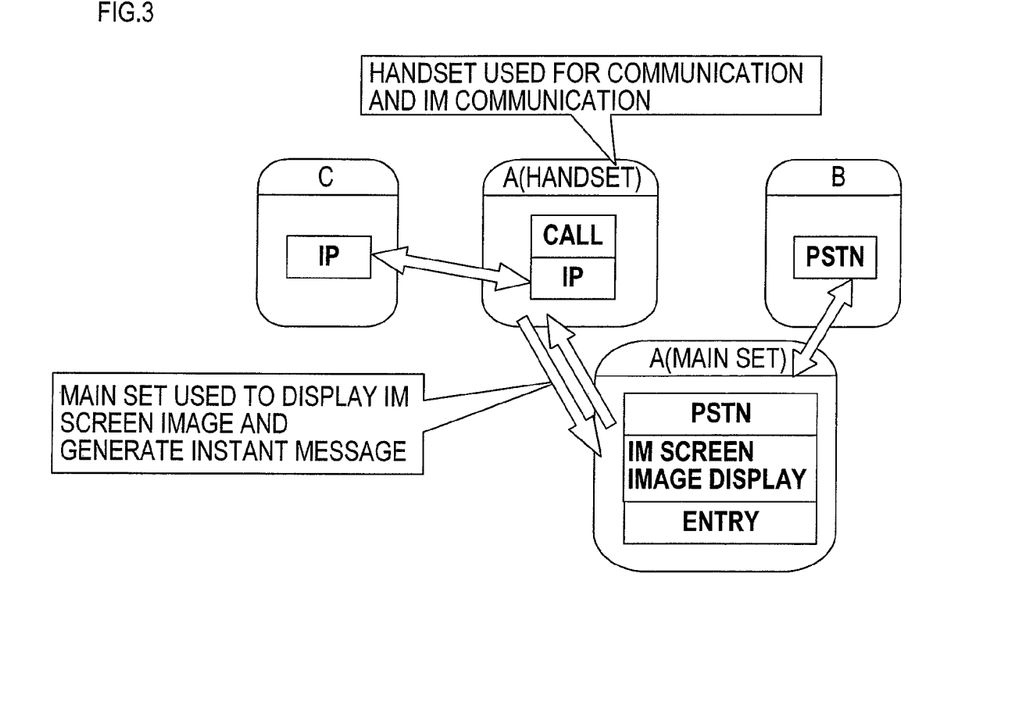
FIG. 3 is a diagram showing a state of the information communication terminal in which both a PSTN call and IM communication are carried out.

FIG. 3 shows the details of the state in which A communicates with B via a PSTN and with C through IM. A communicates with C through IM with the handset, and with B via the PSTN with the main set.

An instant message is generated in the main set and the received instant message is displayed also in the main set. A user can use either the main set or the handset for making and receiving a call.

Figure 4A:
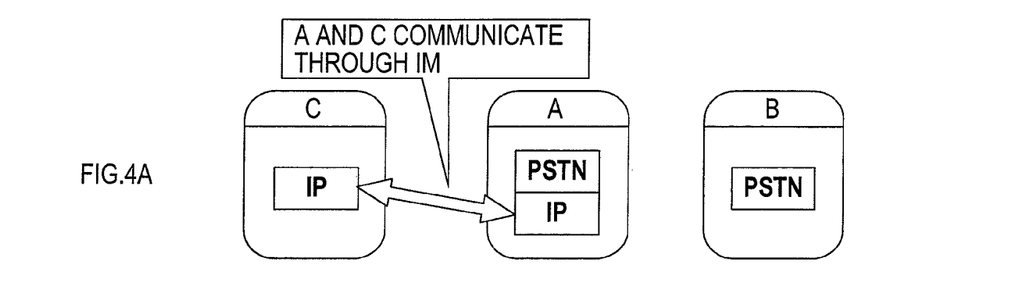
FIGS. 4A and 4B are diagrams showing a state of the information communication terminal in which communication through one of a PSTN call and IM communication is ended.
Figure 4B:
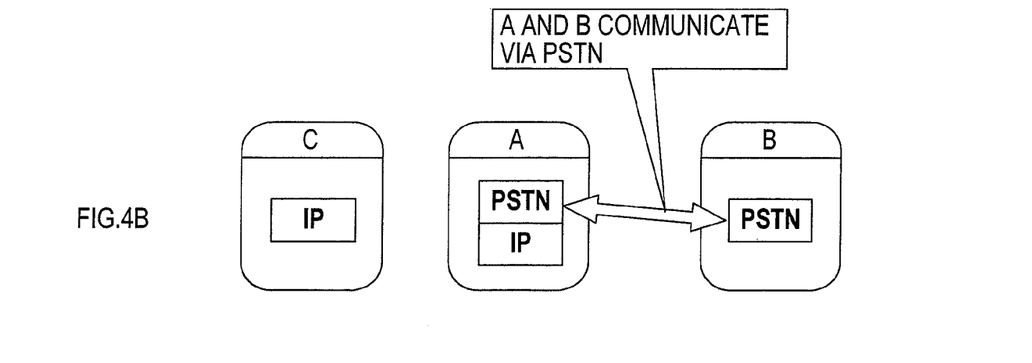

Thereafter, when the PSTN call is ended, only the IM communication between A and C is continued as shown in FIG. 4A. Or, when the IM communication is ended, only the PSTN call between A and B is continued as shown in FIG. 4B.

Figure 5A:
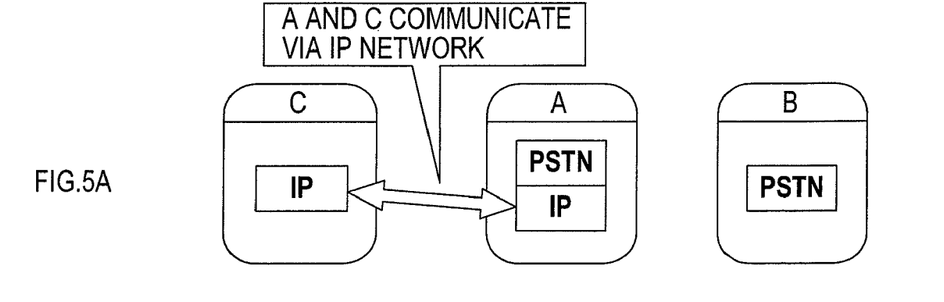
FIGS. 5A-5D are state transition diagrams of the information communication terminal when an incoming PSTN call is received during an IP network call.
Figure 5B:
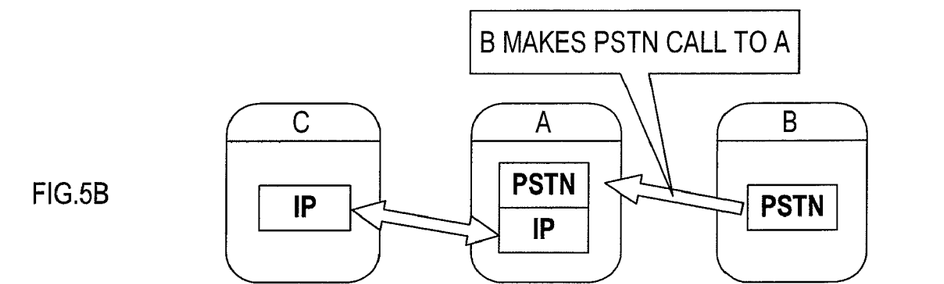

FIGS. 5A and 5B show the state transition in case that B makes a PSTN call to A while A and C communicate through an IP network call. FIG. 5A shows a state in which A and C communicate via an IP network.

Figure 5C:
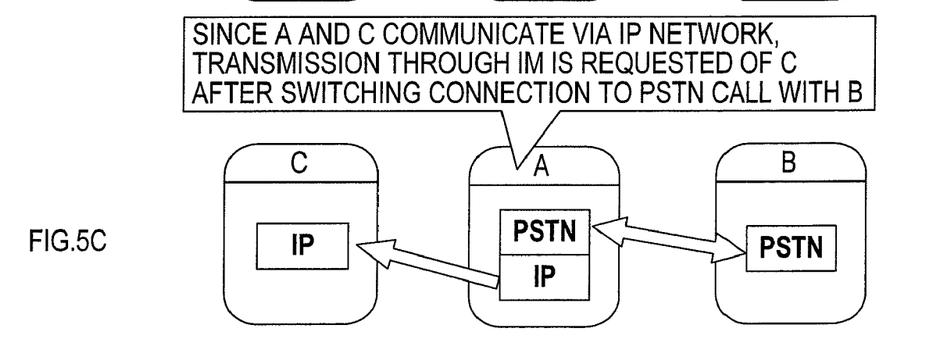
Figure 5D:
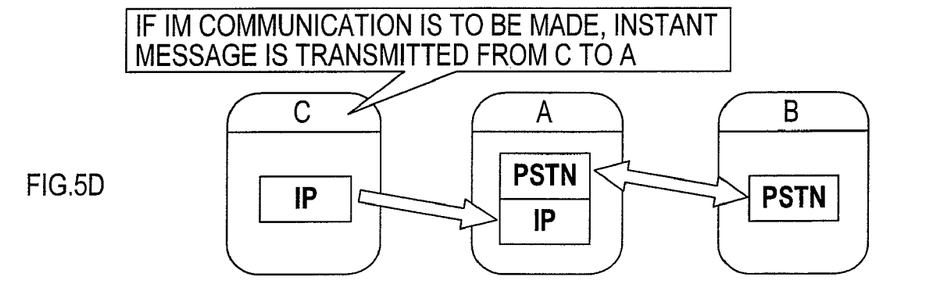

Then, as shown in FIG. 5B, when B makes a PSTN call to A, A, after switching the IP network call with C to a PSTN call with B, requests C to communicate through IM by sending an instant message to C, as shown in FIG. 5C. If C accepts the request and communicates through IM, an instant message is sent from C to A, as shown in FIG. 5D.

(1.4) IM Communication Start Process During PSTN Call

Figure 6:
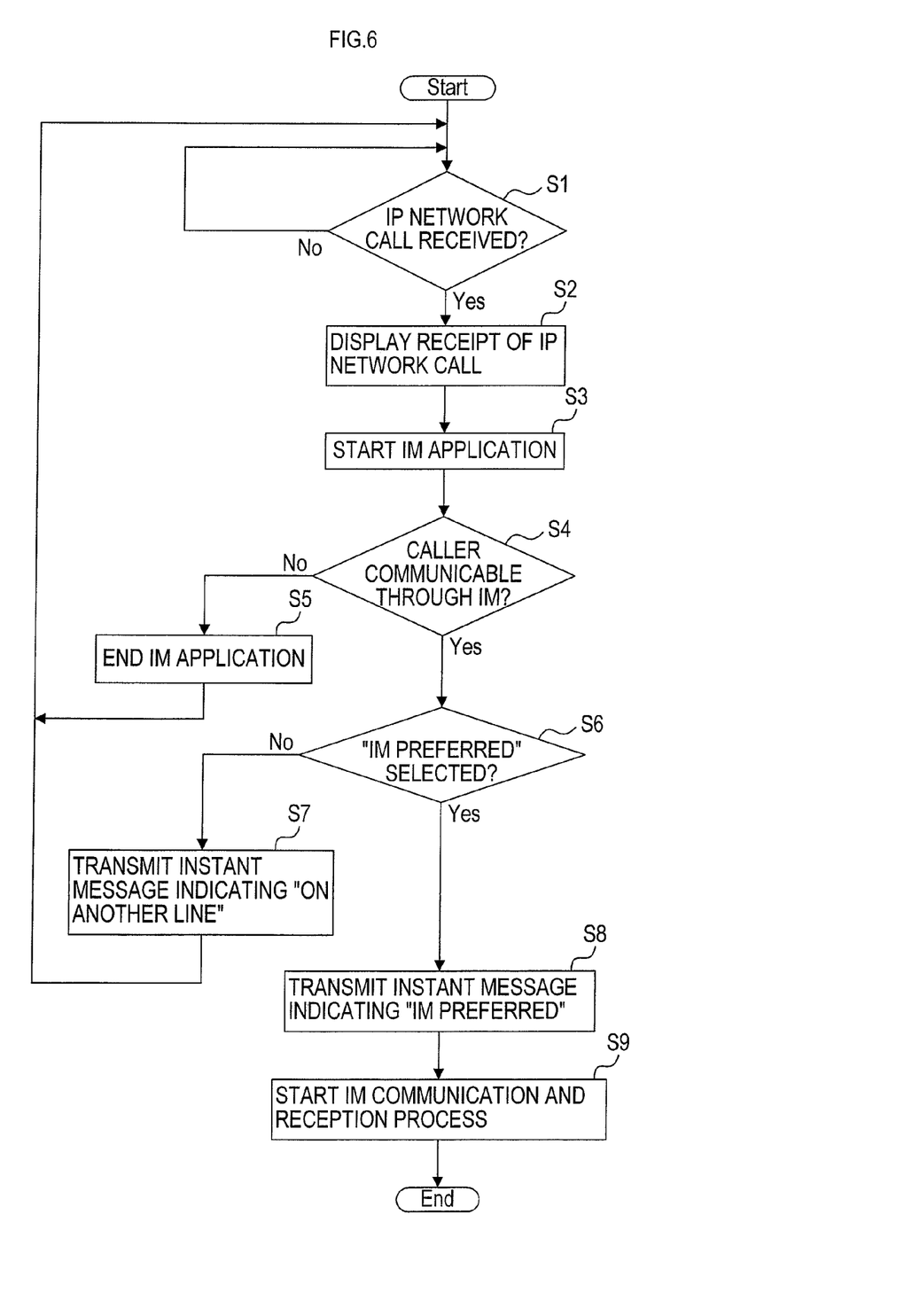
FIG. 6 is a flowchart showing process steps of an IM communication start process during a PSTN call.

Process steps in an IM communication start process during a PSTN call executed by the controller 10 of the handset 2 will be described by way of FIG. 6. The process is started simultaneously with the start of a PSTN call.

Firstly, it is determined whether or not an incoming IP network call is received (S1). If no incoming IP network call is received (S1: No), the process returns to S1. S1 is repeated until receipt of an incoming IP network call.

Figure 7A:
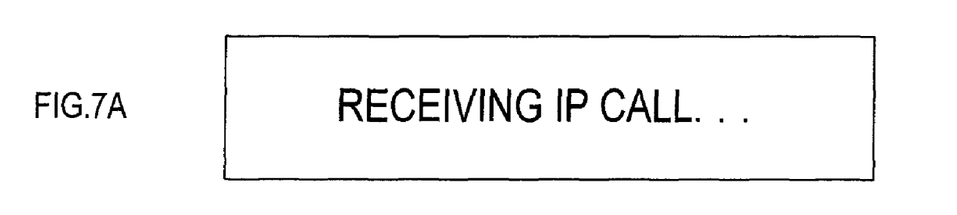
FIGS. 7A and 7B are diagrams showing examples of display modes in a display panel.
Figure 7B:
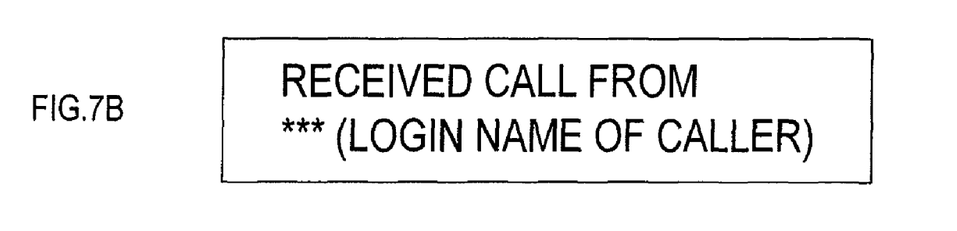

If it is determined that an incoming IP network call is received (S1: Yes), receipt of an incoming IP network call is displayed on the display panel 12 of the handset 2 and the display panel 22 of the main set 3 (S2). If packets indicating incoming call signals include information of the caller (such as the IP address, network address or account ID of the caller's terminal), the information and the registered name in the telephone directory data corresponding to the information, and so on are displayed. Examples of the information displayed on the display panel 22 of the main set 3 are shown in FIGS. 7A and 7B. FIG. 7A shows a state in which an IP network call is being received. FIG. 7B shows a state indicating who made the IP network call. In S2, a flag indicating "finished" is set to the received incoming call so as to avoid executing S1 again based on the same incoming call.

Subsequently, an application for executing IM communication is started (S3).

It is then determined whether or not the caller's telephone terminal can communicate through IM (S4). Here, whether or not the caller's telephone terminal is the IM compatible network telephone terminal 43 is checked by making an inquiry to the IM server 44. Moreover, it is checked whether or not an application necessary to communicate with the information communication terminal 1 through IM is started.

If the caller's telephone terminal is not communicable through IM (S4: No), the application for IM communication is ended (S5). The process returns to S1.

On the other hand, if the caller's telephone terminal is communicable through IM (S4: Yes), it is then determined whether or not selection is made to communicate through IM (S6). Here, a message which urges the user to select whether or not to communicate through IM is displayed on the operation panel 12 of the handset 2, and user input by means of the operation panel 13 is awaited. Upon receipt of the user input, it is determined whether or not selection has been made to communicate through IM.

Figure 8A:
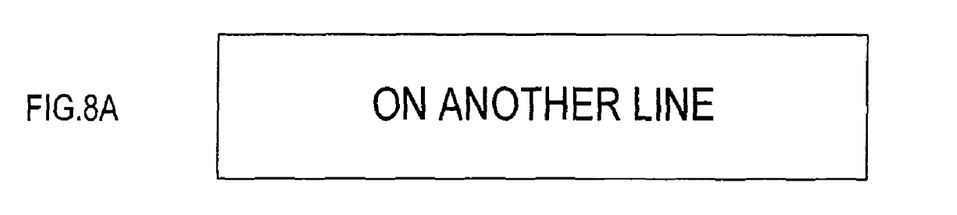
FIGS. 8A and 8B are diagrams showing examples of instant messages transmitted to a terminal to be connected.

If it is determined that selection has not been made to communicate through IM (S6: No), an instant message indicating "ON ANOTHER LINE" is transmitted to the caller's IM compatible IP phone (S7), as shown in FIG. 8A. The process returns to S1. Alternatively, no instant message may be transmitted in S7.

Figure 8B:
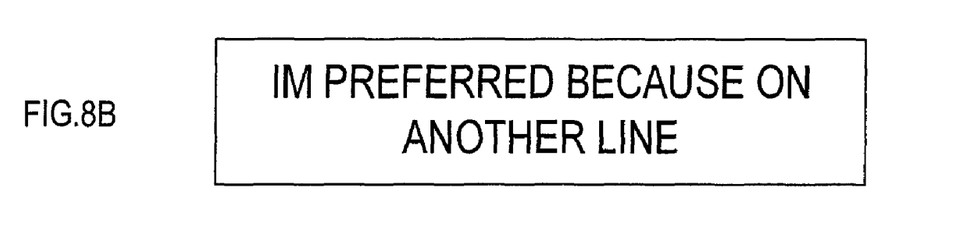

On the other hand, if it is determined that selection has been made to communicate through IM (S6: Yes), an instant message indicating "IM PREFERRED BECAUSE ON ANOTHER LINE" is transmitted to the caller's IM compatible network telephone terminal 43 (S8), as shown in FIG. 8B.

Subsequently, an IM transmission and reception process is started (S9). In the IM transmission and reception process, an instant message is generated and transmitted to the caller's IM compatible network telephone terminal 43 and the transmitted instant message is received and displayed. The details will be described later. The IM communication start process is ended after S9.

(1.5) IM Communication Start Process During IP Network Call

Figure 9:
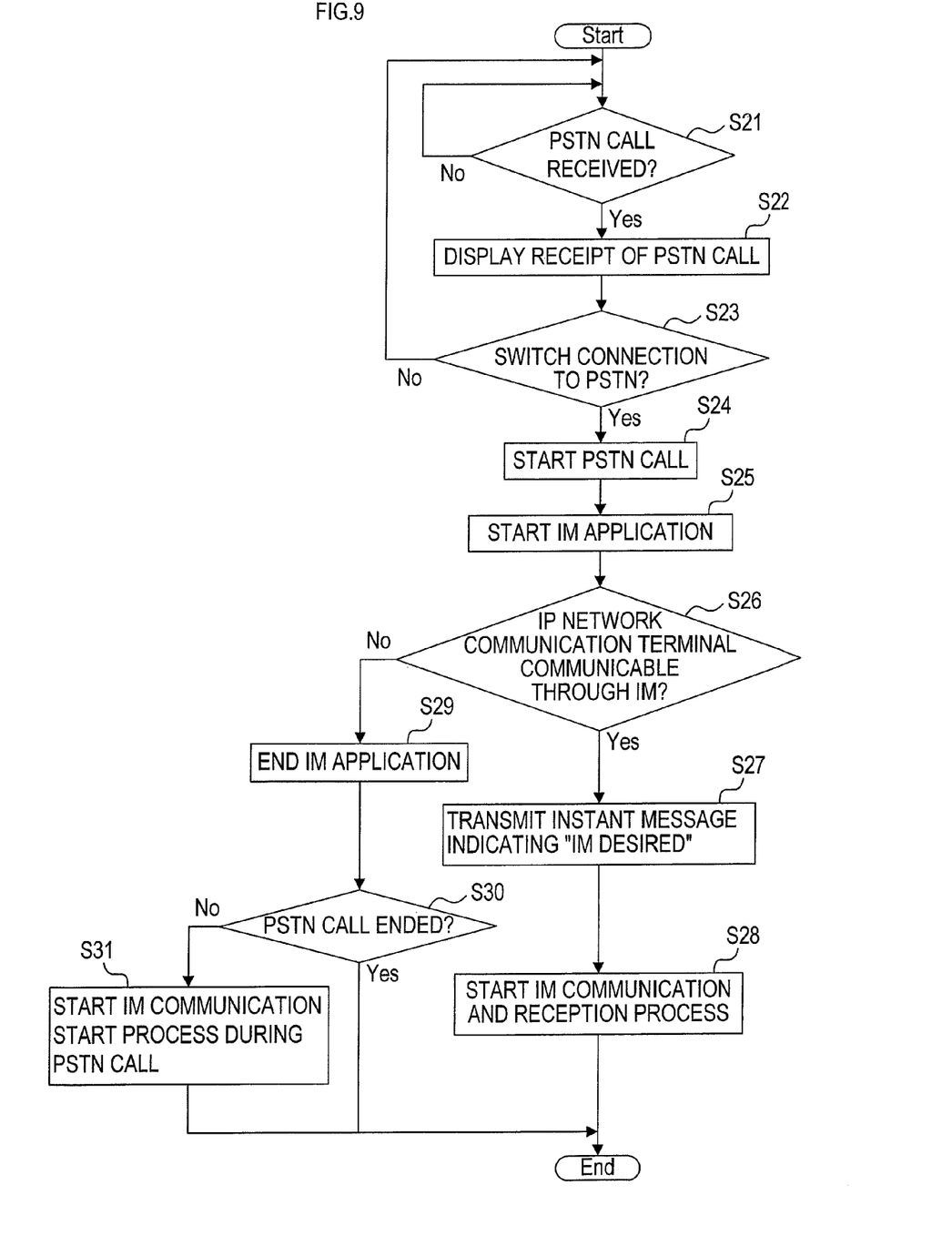
FIG. 9 is a flowchart showing process steps of the IM communication start process during the IP network call.

Process steps in an IM communication start process during an IP network call executed by the controller 10 of the handset 2 will be described by way of FIG. 9. The process is started simultaneously with the start of an IP network call.

Firstly, it is determined whether or not an incoming PSTN call is received (S21). If no incoming PSTN call is received (S21: No), the process returns to S21. Until receipt of an incoming PSTN call, S21 is repeated.

If it is determined that an incoming PSTN call is received (S21: Yes), receipt of an incoming PSTN call is displayed on the display panel 12 of the handset 2 and the display panel 22 of the main set 3 (S22). If incoming call signals include phone number information of the caller, the information and the registered name in the telephone directory data corresponding to the phone number information are displayed. In S22, a flag indicating "finished" is set to the received incoming call so as to avoid executing S21 again based on the same incoming call.

Subsequently, it is determined whether or not selection is made to switch the connection to a PSTN call (S23). Here, a message which urges the user to select whether or not to switch the connection from the IP network call to a PSTN call is displayed on the operation panel 12 of the handset 2, and user input by means of the operation panel 13 is awaited. Upon receipt of the user input, it is determined whether or not selection has been made to switch the connection to a PSTN call.

If it is determined that selection has not been made to switch the connection to a PSTN call (S23: No), the process returns to S21. On the other hand, if it is determined that selection has been made to switch the connection to a PSTN call (S23: Yes), the connection is switched to a PSTN call and the PSTN call is started (S24).

Subsequently, the application for executing IM communication is started (S25).

It is then determined whether or not the IP network telephone terminal which has been connected before switching in S24 is communicable through IM (S26). Here, the same process step described in the above S4 in FIG. 6 is executed.

If the network telephone terminal is communicable via IM (S26: Yes), an instant message indicating "IM preferred because taken over by PSTN call" is transmitted to the IP network telephone terminal which has been connected before switching in S24 (S27). Here, the same process step described in the above S8 in FIG. 6 is executed.

Subsequently, the IM transmission and reception process is started (S28). The present IM communication start process is ended.

On the other hand, if the network telephone terminal is not communicable through IM (S26: No), the application for IM communication is ended (S29). Subsequently, it is determined whether or not the PSTN call is ended (S30). If the PSTN call is ended (S30: Yes), the present IM communication start process is ended. On the other hand, it the PSTN call is not ended (S30: NO), the aforementioned "IM communication start process during a PSTN call" is started (S31). The present IM communication start process is ended.

(1.6) IM Transmission and Reception Process

Figure 10:
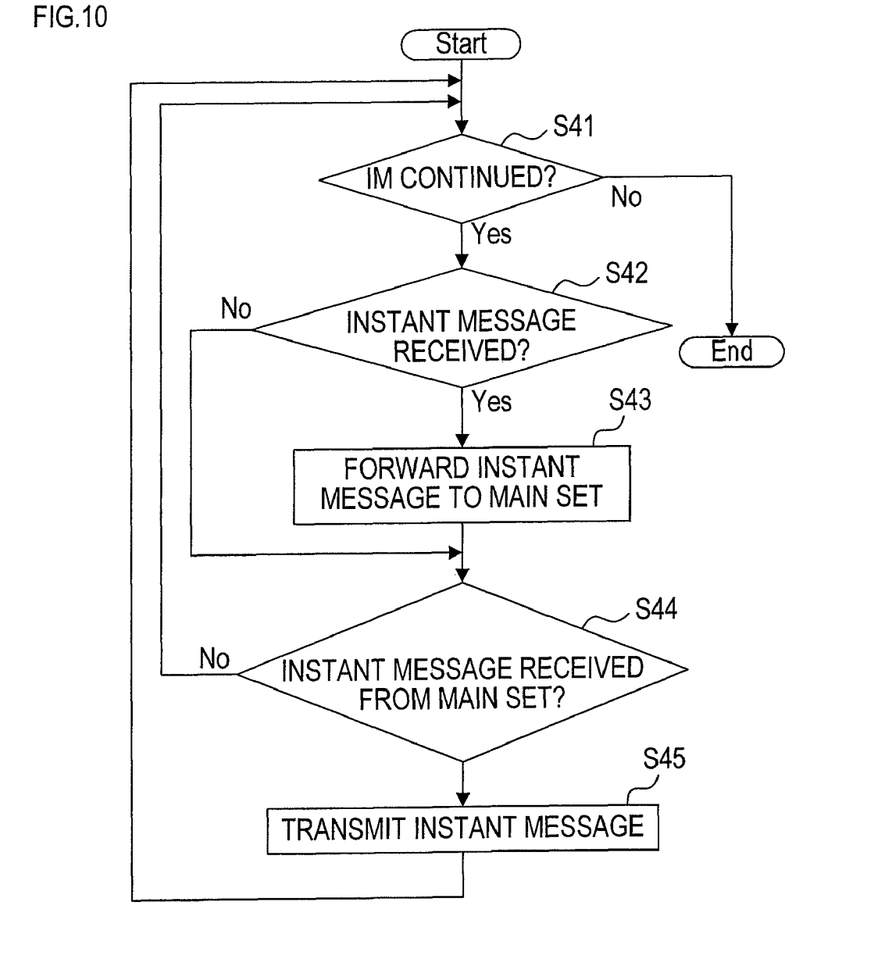
FIG. 10 is a flowchart showing process steps of an IM transmission and reception process.

Process steps of an IM transmission and reception process executed by the controller 10 of the handset 2 will be described by way of FIG. 10. The process is started in S9 in FIG. 6 and in S28 in FIG. 9.

In the IM transmission and reception process, it is firstly determined whether or not a transmission and reception state of an instant message is continued (S41). Here, it is determined whether or not an IM session is established between the information communication terminal 1 and the IM compatible network telephone terminal 43 in the IM server 44. This session is ended when operation to end IM communication is made in either of the terminals or when a predetermined time has passed after connection to the IM server 44 is terminated.

Figure 11:
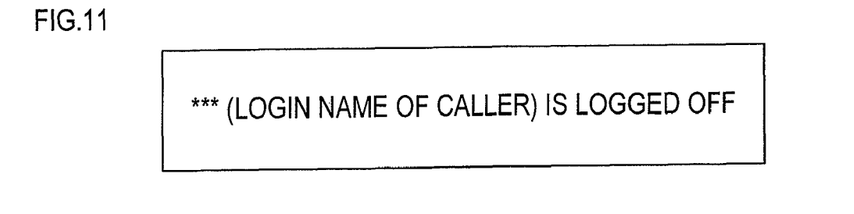
FIG. 11 is a diagram showing an example of a display mode in the display panel upon ending communication via IM communication.

If it is determined that the transmission and reception state of an instant message is not continued (S41: No), the present IM transmission and reception process is ended. When operation which terminates IM communication is performed in the IM compatible network telephone terminal 43, information that IM communication is terminated is displayed on the display panel 22 of the main set 3. An example of the information displayed at this time is shown in FIG. 11.

If it is determined that the transmission and reception state of an instant message is continued (S41: Yes), it is determined whether or not an instant message is newly received from the IM compatible network telephone terminal 43 (S42). If it is determined in S42 that an instant message is not newly received from the IM compatible network telephone terminal 43 (S42: No), the process moves to S44.

On the other hand, if it is determined in S42 that an instant message is newly received from the IM compatible network telephone terminal 43 (S42: Yes), the received IM packets are converted into main set transmission information which is data for use in data transmission to the main set 3 to be transmitted to the main set 3 (S43).

Subsequently, it is determined whether or not message information indicating an instant message newly generated by the main set 3 is received from the main set 3 (S44). If not (S44: No), the process returns to S41. On the other hand, if it is determined that the message information is received (S44: Yes), the received message information is converted into packet data to be transmitted to the IM server 44 (S45). The process returns to S41.

(1.7) Effect of Invention

According to the information communication terminal 1 of the present embodiment, when an incoming call is received, while the information communication terminal 1 is connected either to the telephone terminal 31 via a PSTN or to the IM compatible network telephone terminal 43 via an IP network, from the other of the telephone terminal 31 and the IM compatible network telephone terminal 43, the information communication terminal 1 sends an instant message to the IM compatible network telephone terminal 43 so as to start IM communication. As a result, the information communication terminal 1 can communicate with the telephone terminal 31 via the PSTN and with the IM compatible network telephone terminal 43 through IM. Accordingly, the information communication terminal 1 can smoothly communicate with both the telephone terminal 31 and with the IM compatible network telephone terminal 43.

Also, in the information communication terminal 1 of the present embodiment, when an incoming call is received from the IM compatible network telephone terminal 43 while the information communication terminal 1 is connected to the telephone terminal 31, whether or not to start IM communication is determined by user input. Accordingly, it is convenient since the user can select whether or not to start IM communication depending on importance of the call from the telephone terminal 31 and the caller from the IM compatible network telephone terminal 43.

Also, in the information communication terminal 1 of the present embodiment, when an incoming call is received from the telephone terminal 31 while the information communication terminal 1 is connected to the IM compatible network telephone terminal 43, the connection to the IM compatible network telephone terminal 43 is switched to the telephone terminal 31 and an instant message is automatically sent to the IM compatible network telephone terminal 43. Thus, the user only has to switch the connection to the telephone terminal 31 and can also continue communication through IM with the IM compatible network telephone terminal 43 connected till then. Accordingly, it is convenient since there is no need to operate the operation panel 13 to start the application for IM communication.

The information communication terminal 1 of the present embodiment includes the handset 2 and the main set 3 connected to each other through digital cordless communication and a wireless LAN. Since the handset 2 can be used in both a PSTN call and an IP network call, portability of the handset 2 can provide for comfort when the handset 2 is used only for making and receiving calls. Also, in the case of IM communication, the display panel 22 and the operation panel 23 of the main set 3 can be used. Even if the handset 2 is being used for a call, the user can enter an instant message, confirm the entered instant message, and display a received instant message in the main set 3. Accordingly, IM communication can be conveniently achieved.

Second Embodiment (2.1) Overall Structure

The information communication terminal 1 of a second embodiment basically has the same structure as that of the first embodiment. However, the process steps executed by the controller 10 are partly changed. The changed steps will be explained hereinafter.

(2.2) IM Communication Start Process During PSTN Call

Figure 12:
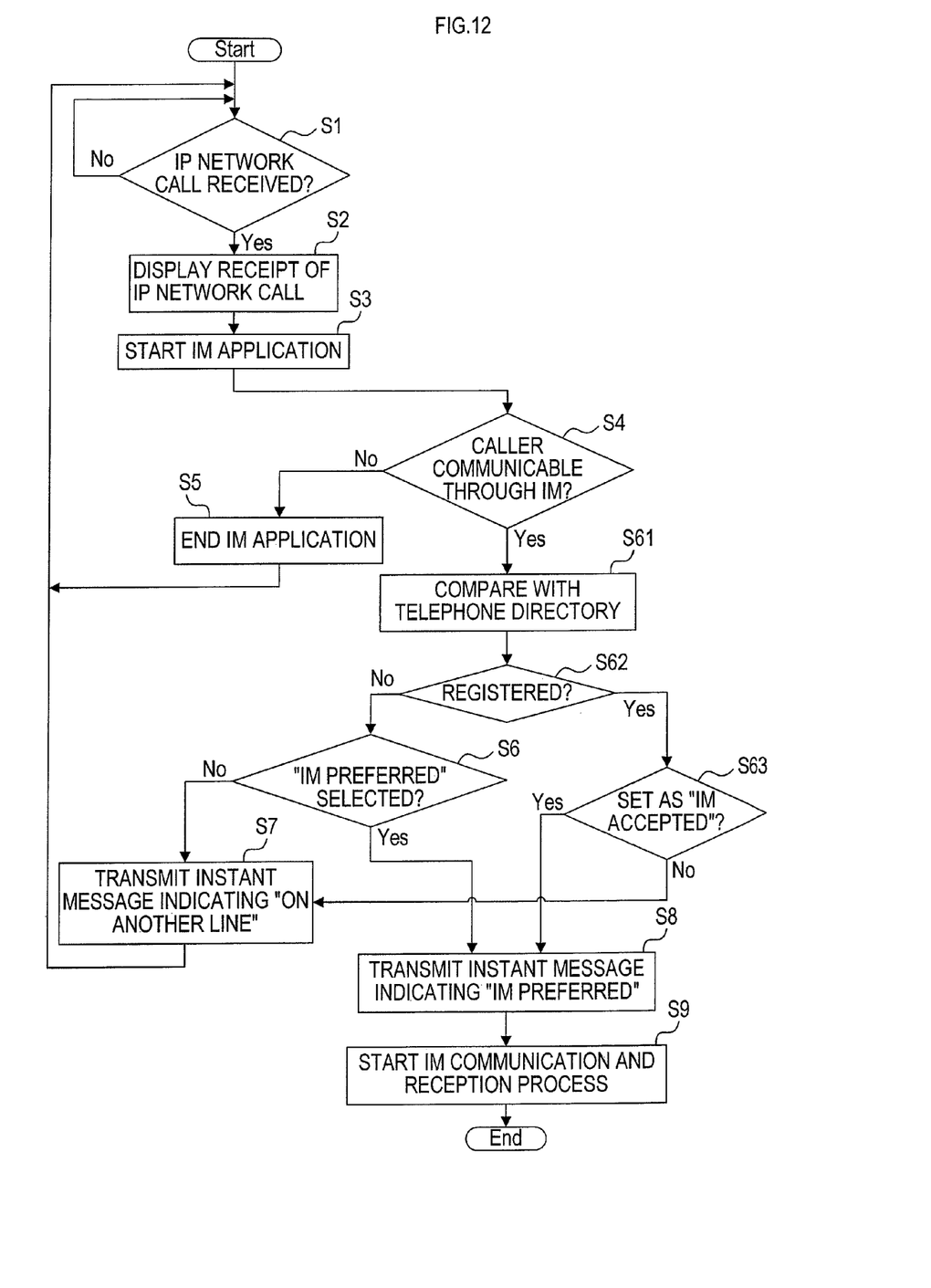
FIG. 12 is a flowchart showing process steps of the IM communication start process during the PSTN call according to a second embodiment.

The IM communication start process during a PSTN call according to the present embodiment will be described by way of FIG. 12. Most of the steps in this process are the same as those of the process according to the first embodiment shown in FIG. 6. Thus, the same reference numbers are added to the same steps as in FIG. 6 in order not to repeat the same description, and only the differences are described.

In S4 of the present process, if it is determined that the caller's telephone terminal is communicable through IM (S4: Yes), the caller information contained in the received data as an incoming call is compared with the data registered in the telephone directory (S61).

Figure 13:
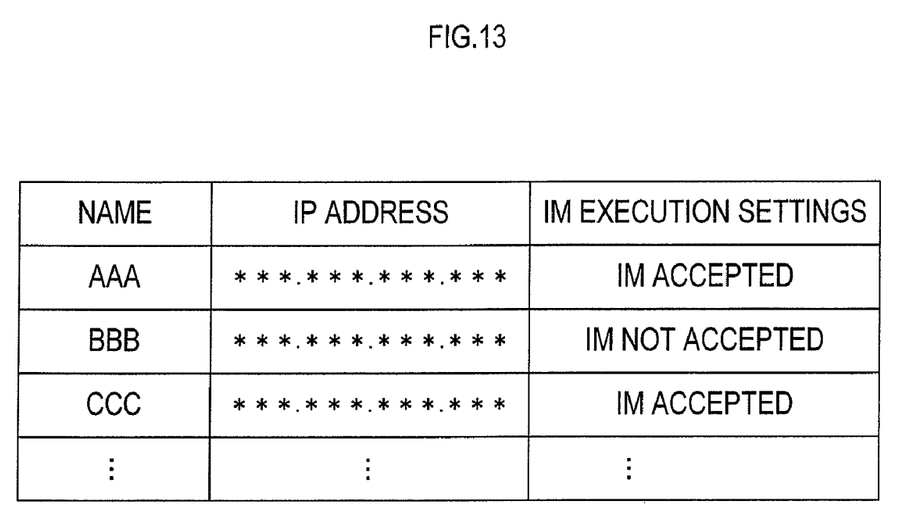
FIG. 13 is a diagram showing a data structure of a telephone directory.

The telephone directory, as shown in FIG. 13, is a data table which can store a plurality of data groups including the names to be connected, IP addresses of the terminals to be connected as connecting information, and IM execution settings. For the connecting information, network addresses or account IDs may be also used.

As a result of comparison in S61, if the telephone directory does not store corresponding data (S62: No), that is, the IP address of the caller does not coincide with any of the registered IP addresses, the process moves to S6.

On the other hand, if the telephone directory stores corresponding data (S62: Yes), it is determined whether or not the IM execution settings corresponding to the data group are set as "IM ACCEPTED" (S63). If set as "IM ACCEPTED" (S63: Yes), the process moves to S8. If not (S63: No), the process waves to S7.

(2.3) Effect of Invention

In the information communication terminal 1 constituted as such, whether or not to transmit an instant message can be determined depending on the registered IM execution settings in the storage unit.

Accordingly, if the user receives an incoming call from the IM compatible network telephone terminal 43 during the call with the telephone terminal 31 and if the caller is a person desired to be connected by IM, a request for IM communication is automatically requested by setting the IM execution settings as "IM ACCEPTED" in advance. If the caller is a person the user does not desire to be connected by IM, a request for IM communication is not requested by setting the IM execution settings as "IM NOT ACCEPTED" in advance.

[Variation]

In the above, an embodiment of the present invention has been described. However, the present invention is not limited to the above embodiments and can take various modes without departing from the technical scope of the present invention.

For instance, in S6 of the IM communication start process during a PSTN call (FIG. 6), the timing to accept user input on whether or not to communicate through IM is after receipt of an incoming call in S1. However, the timing to accept user input can be before starting the connection or after starting the connection and before receiving an incoming call.

In the IM communication start process during an IP network call (FIG. 9), it is determined whether or not to switch the connection to a PSTN call according to user input in S23. However, the connection may be automatically switched to a PSTN call without user input when a PSTN call is received.

In the IM communication start process during an IP network call (FIG. 9), after starting a PSTN call in S24, an instant message is transmitted without enabling user selection on whether or not to communicate through IM. However, the selection may be enabled.

In the above embodiments, the information communication terminal 1 includes the handset 2 and the main set 3. However, the information communication terminal 1 may be constituted differently. For example, the handset 2 and the main set 3 may not be separate but integrally formed. Or, the handset 2 may be directly connected to the PSTN 30 and the main set 3 has only the function for entering and displaying an instant message.

In the above embodiments, the example of the external terminal which communicates with the information communication terminal 1 via the PSTN 30 is the telephone terminal 31 having only the PSTN communication function. However, if the telephone terminal 31 has the function for IM communication, the information communication terminal 1 and the telephone terminal 31 can simultaneously communicate both via a PSTN and through IM.

Moreover, in case that the telephone terminal 31 has a function for IP network calls, if the telephone terminal 31 makes an IP network call to the information communication terminal 1 while the information communication terminal 1 and the telephone terminal 31 communicate through a PSTN call, the information communication terminal 1 executes the "IM communication start process during a PSTN call" and can start communicating with the telephone terminal 31 through IM.

What is claimed is:

1. An information communication terminal comprising:
   a voice communication device that transmits and receives voice signals to and from telephone equipment via a public switched telephone network;
   a data communication device that transmits and receives call data signals as digitized voice signals to and from another terminal via an IP network;
   a message communication device that transmits and receives data signals of an instant message which contains character information to and from the other terminal via an IP network;
   a switching device that, when the voice signals are received by the voice communication device while the call data signals are being transmitted and received by the data communication device, performs switching operation to urge the data communication device to stop transmission and reception of the call data signals and urge the voice communication device to start transmission and reception of the voice signals; and a control device that makes the message communication device transmit the data signals of the instant message to a destination of the call data signals by the data communication device, when the switching operation is performed by the switching device.

2. The information communication terminal as set forth in claim 1, further comprising:

a transmission command accepting device that accepts a transmission command, wherein, when the transmission command is accepted by the transmission command accepting device, the control device makes the message communication device transmit the data signals of the instant message to the destination of the call data signals, when the switching operation is performed by the switching device.

3. An information communication terminal comprising:

a voice communication device that transmits and receives voice signals to and from telephone equipment via a public switched telephone network;

a data communication device that transmits and receives call data signals as digitized voice signals to and from another terminal via an IP network;

a message communication device that transmits and receives data signals of an instant message which contains character information to and from the other terminal via the IP network;

a storage device that is configured to store a plurality of destination information, to and from the destination the call data signals being transmitted and received;

a comparing device that, when the call data signals are received by the data communication device while the voice signals are being transmitted and received by the voice communication device, compares the received destination information with the destination information stored in the storage device; and a control device that, when the call data signals are received by the data communication device while the voice signals are transmitted and received by the voice communication device, makes the message communication device transmit the data signals of the instant message to a destination of the call data signals depending on a result of comparison by the comparing device.

4. The information communication terminal as set forth in claim 3, wherein the comparing device determines whether or not a sender of the call data signals is configured to transmit and receive the data signals of an instant message based on the destination information stored in the storage device, and, when it is determined that the sender is configured to transmit and receive the data signals of an instant message, further determines whether or not the sender accepts transmission and reception of the data signals of an instant message.

5. The information communication terminal as set forth in claim 1, wherein the information communication terminal includes a main set and a handset, the main set includes:
an input device that receives entry of message information; and
a main set side transmitting device that transmits the message information entered by the input device to the handset, the handset includes:
a handset side receiving device that receives the message information transmitted by the main set side transmitting device;
a message converting device that converts the message information received by the handset side receiving device into the data signals of the instant message;
the voice communication device;
the message communication device that transmits and receives the data signals of the instant message converted by the message converting device; and
the control device.

6. The information communication terminal as set forth in claim 5, wherein the handset further includes:
a data signal converting device that converts the data signals of the instant message received by the message communication device into main set transmission information; and
a handset side transmitting device that transmits the main set transmission information converted by the data signal converting device to the main set, and the main set further includes:
a display device that displays the main set transmission information transmitted by the handset side transmitting device.

7. The information communication terminal as set forth in claim 6, wherein the display device displays the message information entered by the input device.

8. The information communication terminal as set forth in claim 1, wherein the voice communication device transmits and receives the voice signals to and from the telephone equipment through digital cordless communication, and
the data communication device transmits and receives the call data signals to and from the other terminal via a wireless LAN.

9. The information communication terminal according to claim 3, further comprising:

a transmission command accepting device that accepts a transmission command,
wherein, when the transmission command is accepted by the transmission command accepting device, and when the call data signals are received by the data communication device while the voice signals are transmitted and received by the voice communication device, the control device makes the message communication device transmit the data signals of the instant message to the destination of the call data signals.

* * * * *